United States Patent [19]

Fish et al.

[11] 4,241,420
[45] Dec. 23, 1980

[54] DISK DATA CONTROL

[75] Inventors: Leonard A. Fish; Charles E. Fiterman, both of Chicago, Ill.

[73] Assignee: Bank Computer Network Corporation, Schiller Park, Ill.

[21] Appl. No.: 956,723

[22] Filed: Nov. 1, 1978

Related U.S. Application Data

[63] Continuation of Ser. No. 746,057, Nov. 29, 1976, abandoned.

[51] Int. Cl.³ .............................................. G06F 13/04
[52] U.S. Cl. ..................................... 364/900; 360/50
[58] Field of Search ... 364/200 MS File, 900 MS File; 360/39, 50

[56] References Cited

U.S. PATENT DOCUMENTS

| 3,593,298 | 7/1971  | Armstrong ........................ | 364/900 |
| 3,657,706 | 4/1972  | Horgan et al. ................... | 364/900 |
| 3,990,050 | 11/1976 | Koletois et al. .................. | 364/200 |
| 4,017,838 | 4/1977  | Breyer ............................... | 364/200 |
| 4,071,890 | 1/1978  | Pandeya ........................... | 364/200 |

Primary Examiner—Gareth D. Shaw
Assistant Examiner—C. T. Bartz
Attorney, Agent, or Firm—Hill, Van Santen, Steadman, Chiara & Simpson

[57] ABSTRACT

A control unit for supervising operation of data transmission to and from a data storage device such as a disk storage device, has a stored program for the unit, and a random access memory sufficient to store an entire block of data received from the data storage device. In one arrangement, the control unit works in conjunction with external data processing apparatus, and the control unit controls interchange of data between the data processing apparatus and the data storage device. The external data processing apparatus has a reduced memory capacity requirement, because of the control unit, and delays caused by static timing requirements are minimized. When the data storage device is a disk storage device, reading is performed without delay, using the first available sector of the disk in a given track. The random access memory stores the identity of the sectors which have been successfully read in the current operating sequence, so that, at the beginning of any such sequence, the first available unread sector is read and processed, irrespective of the position of such sector relative to the previously read sector. Data processing operations are completed by the control unit within the intersector gap which separates two sectors of recorded data, so that an entire track can be processed in a single disk rotation, if no writing is required. During a track selection operation, the control unit operates the track selecting mechanism slightly faster than the selecting mechanism's maximum operating speed, and repeats the track selection operation until the desired track is selected, thus avoiding delays.

Because of the speed of operation of the disk controller, and the completeness of its performance, the time required for interrupts in the programs of the external data processing apparatus is materially reduced, and the capacity required of an external processor, for any application, is also much smaller.

20 Claims, 6 Drawing Figures

| EXTERNAL | COMMANDS | |
|---|---|---|
| COMMAND | ADDRESS | DESCRIPTION |
| 0 | 00F | SET POINTERS |
| 1 | 01F | GET BYTE |
| 2 | 02F | PUT BYTE |
| 3 | 03F | SEEK |
| 4 | 04F | READ |
| 5 | 05F | WRITE |
| 6 | 06F | EXEC RAM PGM |
| 7 | 07F | FORMAT |

Fig. 4B(2)

DISK DATA CONTROL

This is a continuation of application Ser. No. 746,057, filed Nov. 29, 1976, now abandoned.

BACKGROUND

1. Field of the Invention

The present invention relates to data transmission control units, and more particularly to control units of the type which function to control data transmission between data processing apparatus and a disk storage device, such as the type generally known as a floppy disk storage device.

2. The Prior Art

Floppy disk storage devices are manufactured by a variety of manufacturers, and differ from each other in a number of respects. One group of such disk storage devices, however, is distinguished by a common style of formatting of stored data, and such formatting lends a certain degree of standardization to the disk storage devices. In a commonly used format, a number of data storage tracks is provided on each disk, typically 75, and each track is divided into a number of sectors, 26 of which are typically available to store data, and each sector is capable of storing a number of eight-bit characters, or "bytes". Control units which have heretofore been used with such disk storage devices have functioned to read an entire sector from the disk directly into a memory or buffer located at a central processing unit, under control of the control processing unit, with the central processing unit transmitting an entire sector to the disk control unit for writing. Such control units are not able to process information except for certain checking and retry routines, and transmission to and from the central processing unit is in complete sectors only. When a reading operation is not completed properly, repeated retries are preformed successively, during successive revolutions of the disk, with no reading of any other data from the disk.

This mode of operation leads to severe limitations in the speed of operations using the disk storage device, and places an upper limit on the number of operations which can be performed during any given interval, using the disk storage device.

Another limitation of most of the heretofore known disk control units is that they are not able to search for and process logical records which are more or less than a single sector in length.

Because of the need to transfer data directly to a memory of the central processing unit, and the many operations, for checking and the like, which must be carried out by the central processing unit in connection with such a transfer, it is usually not possible to finish the processing of any sector of data until after the next sector has begun to pass under the read/write head. And since sectors are typically processed in sequential order, when this occurs it is necessary to wait for nearly an entire revolution of the disk between sectors which are read. This too limits the average operating speed of prior art disk control units.

When a track selection operation is performed, previously known disk control units such as floppy disk units, which use stepping motors to move the head, function to cautiously advance the track selection mechanism in a series of stepwise movements, with the steps widely spaced so that each step can always be completed before the next is commanded. This also represents a limitation on operating speed.

A host of other disadvantages characterize the apparatus of the prior art, such as lack of flexibility in adapting to different storage formats on the disks, and the need for a case or housing separate from the disk storage unit itself. Many of the prior art devices also suffer from system parameters which allow only very narrow time periods during which certain events can be performed.

Accordingly, it is desirable to provide an apparatus and method for increasing the overall efficiency of use of disk storage devices, by avoiding the limitations which have been described.

BRIEF SUMMARY OF THE INVENTION

It is a principal object of the present invention to provide an apparatus and method for decreasing the time required for a number of different operations to be performed.

Another object of the present invention is to provide an apparatus and method whereby the first available sector of the disk is read, irrespective of its order relative to the last read sector.

A further object of the present invention is to provide an apparatus and method to permit processing of information read from a sector of the disk in many formats, during the interval corresponding to the head traversing the gap between adjacent sectors of the disk.

A further object of the present invention is to provide a memory for maintaining a record of the sectors of a track which have been read in performance of a given operation.

Another object of the present invention is to provide an apparatus and method for initiating read operations with respect to the disk storage unit without any time delay preceding such operations.

A further object of the present invention is to provide an apparatus and method which enables the continuous actuation of the read head during reading operations.

Another object of the present invention is to provide a method and apparatus for enabling a disk control unit to deal with logical records recorded on a disk storage device, irrespective of their length relative to the length of data stored in a single sector, without interrupting an external data processor.

A further object of the present invention is to provide a disk control unit having a random access memory sufficient to store data recorded on an entire sector of a disk storage device, and with the ability to transmit and receive, with an external processing unit, a lesser quantity of data for reading and writing.

Another object of the present invention is to provide an inexpensive apparatus and method for achieving greater track selection speeds by driving the track selection apparatus of a data storage device at greater than its optimum operating speed, with means for performing a correction routine until the desired track is selected.

These and other objects and advantages of the present invention will become manifest by an examination of the following description and the accompanying drawings.

In one embodiment of the present invention, there is provided a disk control unit for controlling operation of a disk storage device, including means for driving the track selection apparatus of the disk storage device at a rapid rate without timing restraints during a track selecting operation, means for initiating a reading operation immediately after stopping such drive, means for comparing the selected track with the desired track and for repeating the track selecting operation in response to such comparison if said tracks are not identical, a random access memory for storing data read from an entire sector of the disk storage device, means for checking said data as it is read from said disk storage device and for processing said data while the read/write means of said disk storage device is in the gap located between adjacent sectors of said disk, means for maintaining a record of sectors which have been read from said disk storage device in performance of an operation utilizing a single track, means for comparing the identity of a sector being read with the sectors which have been read, and means responsive to such comparison for initiating said operation on the data from said sector only when the sector being read is not identical with a sector which has been read, means for manifesting a signal when all sectors on a track have been processed, and means enabling transmission of data read from a sector to an external device, such transmitted data being transmitted in variable length blocks.

BRIEF DESCRIPTION OF THE DRAWINGS

Reference will now be made to the accompanying drawings, in which:

FIG. 4 incorporating FIGS. 4a-4b, are diagrams illustrating operations which are performed by the apparatus of FIG. 1.

DETAILED DESCRIPTION OF THE INVENTION

Figure 1:
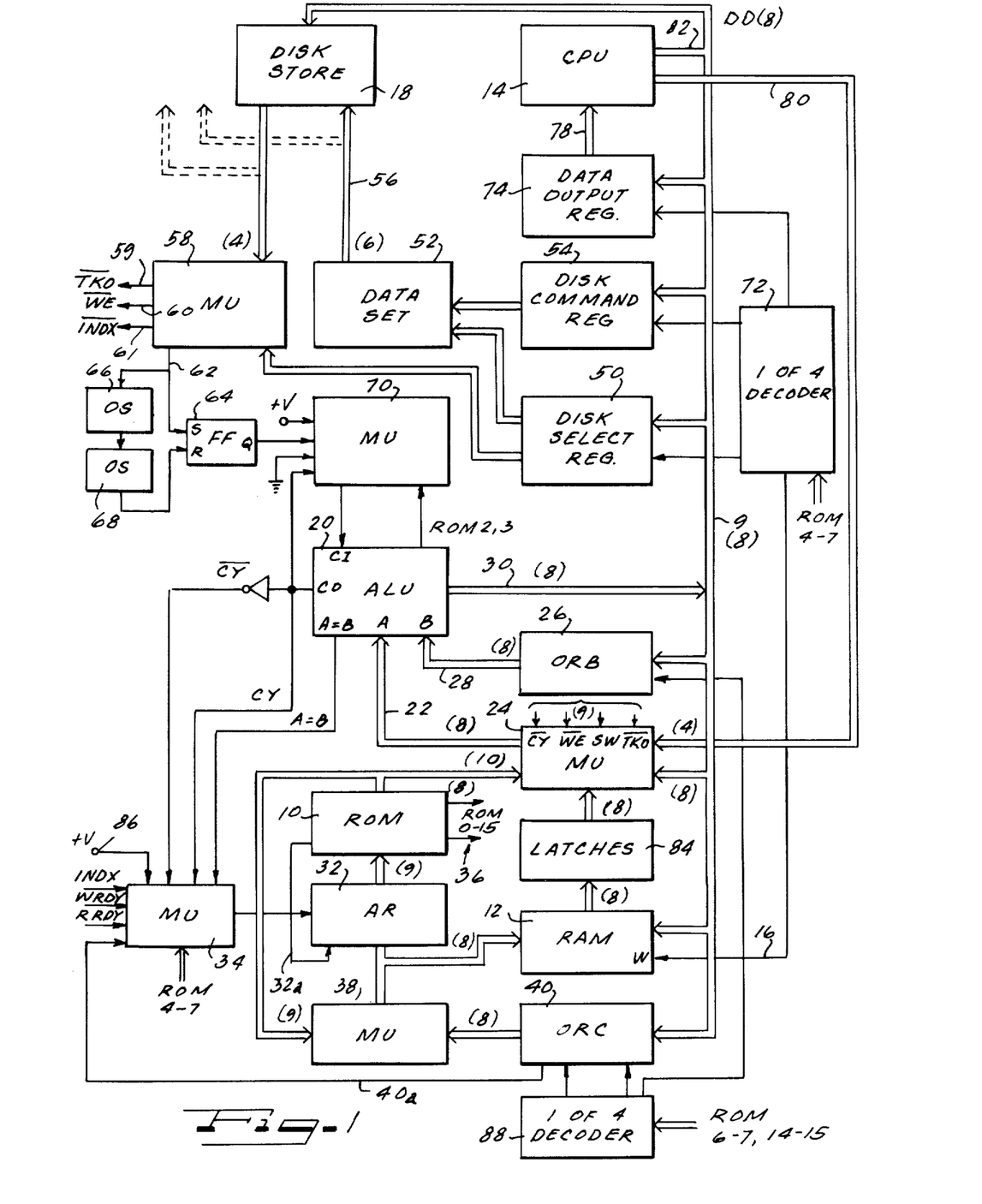
FIG. 1 is a schematic block diagram of apparatus incorporating an illustrative embodiment of the present invention.

Referring now to FIG. 1 a functional block diagram of apparatus incorporating an illustrative embodiment of the present invention is illustrated, including a disk storage unit 18, a central processing unit 14, and a control unit, which comprises the rest of the diagram of FIG. 1. Two memory sections are employed. A read only memory 10, (or ROM), is employed for storing instructions and data which is used to control operation of the apparatus of FIG. 1, and a random access memory (or RAM) 12 is used for storing and making available information used during the operation.

The apparatus cooperates with the processing unit 14 (or CPU), which is sometimes hereinafter referred to as an external CPU, to differentiate it from the processing apparatus of the control unit. In operation, a signal from the CPU 14 causes the control apparatus of FIG. 1 to undertake a sequence of operations, processing data read from the disk storage device and making the results available to the CPU 14.

The RAM 12 is connected with the disk storage device 18 over a data bus 9, which is identified as eight parallel lines by the numeral 8 in paranthesis. Information or data is written into the RAM 12 when its write input W is energized, over a line 16, in the manner which is well known and understood to those skilled in the art. Information is read from the disk and stored in the RAM 12 during read operations, and information can also be read from the RAM and written into disk storage when desired. An arithmetic and logic unit (or ALU) 20 is provided to perform arithmetic and logic functions. Its functions are performed relative to two operands, hereinafter referred to as the A operand and the B operand. The A operand is received on a line 22 connected to the output of a multiplexer 24, which has a variety of inputs. The multiplexer 24 is controlled in its operation to select one of its inputs for use as the A operand, and this signal is then fed to the ALU unit 20. An ORB register 26 is provided for storing the B operand, which is communicated to the ALU 20 over a line 28.

The output of the ALU 20 is connected to the data bus 9, over a line 30, and the data bus 9 is connected to a variety of destinations. One or more of the destinations are selected for connection to the data bus 30 in accordance with the operation which is currently being performed by the apparatus of FIG. 1.

The operations currently being performed are determined in general by the contents of the ROM 10, which contain a series of instructions, which are performed in a given sequence in order to carry out the overall operations of the apparatus.

A nine-bit address register 32 is provided, which addresses the ROM 10, and the address register is set by data received from a multiplexer 38, or incremented so that address locations are accessed sequentially. One bit of the address register is set over a line 32a from the ROM 10.

A multiplexer 34 is provided for either incrementing the address register 32, or for setting it in accordance with data from the multiplexer 38. When the address register 32 is incremented, the instructions stored in the ROM 10 are executed in sequence as they are stored in the ROM. When the address register 32 is not incremented, but is set to a value which is different from the next incremental value, the equivalent of a jump instruction is performed, and one or more instructions in the ROM are skipped, with control passing to a non-sequential instruction stored in the ROM.

The output of the ROM is manifested on a number of output lines 36, which have individual functions, as is explained in more detail hereinafter. Eight lines of the lines 36 contain either data or an address, and they are connected to inputs of a multiplexer unit 38. A ninth line is connected from the ROM 10 to a control input of the multiplexer 38, to select the source of the signal supplied from the multiplexer to the address register 32. The multiplexer 38 is also connected to a register 40, hereinafter referred to as the ORC register. The output of the multiplexer 38 is made available to the address register 32, and also to the address inputs of the RAM 12, so that the multiplexer 32 can control addressing of the RAM. One output of the ORC 40 is also connected to an input of the multiplexer 34 over a line 40a, so that the ORC register can, under certain circumstances, control setting of the address register 32.

In addition to the eight bits which are supplied by the ROM to the multiplexer 38, 16 other outputs are provided from the ROM, each of which is connected, either singly or as one of a group of lines, to one or more gates in order to perform a specific gating function in response to the presence or non-presence of a signal on these individual output lines of the ROM 10. This makes elaborate decoding schemes (in order to derive gating signals from the outputs of the ROM) unnecessary, and the outputs of the ROM are used for the most part directly as gating signals.

Figures 2, 4A:
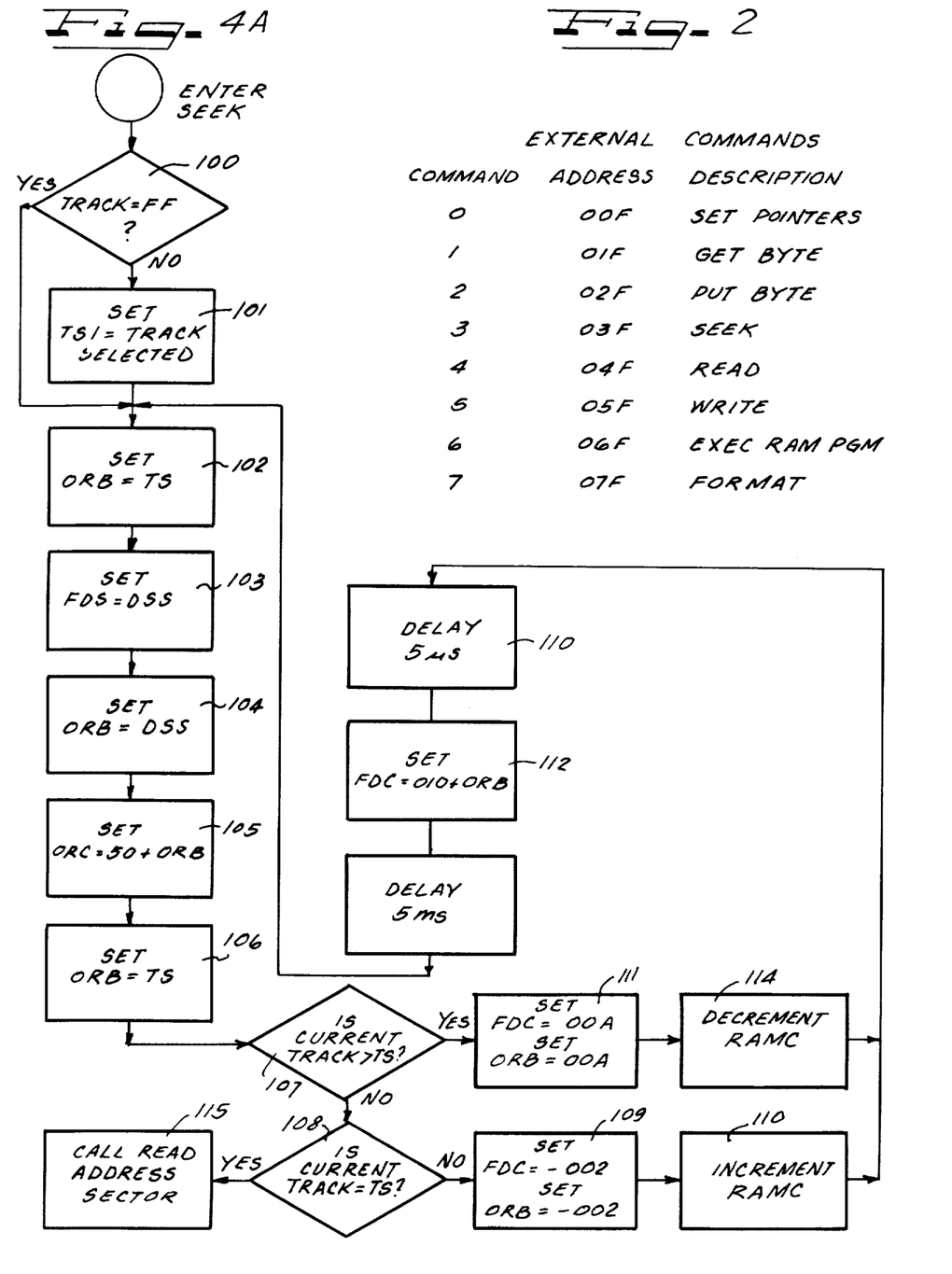
FIG. 2 is a table of instructions which are performed by the apparatus of FIG. 1.

The apparatus illustrated in FIG. 1 is operated in response to a relatively limited number of instructions all of which may be transmitted to the control unit from the CPU 14. The entire instruction set for the control unit is illustrated in FIG. 2. The instructions from the CPU 14 cause the apparatus of FIG. 1 to deal with a logical record recorded on a track of the disk storage. It is not necessary for the apparatus of FIG. 1 to transmit to the CPU the data recorded on an entire sector of the disk, but it is sufficient to communicate only data with respect to the presence or absence of a given logical record. In some cases, but not always, the logical record itself may be transmitted to the CPU. In other instances, it is sufficient to transmit to the CPU merely an indication that a record having certain characteristics has been found, or how many such records are found on a single track of the disk.

A portion of the RAM 12 is devoted to storing an indication of the sectors of the track which have been processed in accordance with the instruction received from the CPU 14 which is currently governing operation of the apparatus of FIG. 1. This portion of the RAM 12 will hereinafter be referred to as the sectors which have been read memory, or the SRM. It identifies the sectors of a single track which have been read and successfully processed in accordance with the CPU instructions which are currently being performed.

The sectors on the disk storage unit 18 are processed in the order in which they become available to the apparatus of FIG. 1; not in numerical order as they are recorded on the disk. The use of the SRM makes it possible to identify, for each sector which is read from the disk, whether that sector has already been read and processed. If so, the next successive sector is immediately read into the RAM 12 and the same test is made. This sequence continues until a sector which has not previously been read in connection with the current instruction is encountered, and after this sector is read into the RAM 12, it is processed in accordance with the CPU instructions. For the most part, such processing occurs in the gap which separates adjacent sectors on each track of the disk storage unit. This gap is placed between adjacent sectors in order to permit the writing of one sector without adversely affecting any other sector.

The length of the inter-sector gap is conventionally fixed at a constant interval, for historical reasons, which are not relevant to the present invention. This gap represents a substantial time period in which no information is being made available from the disk storage device, and during which no data can be written onto the disk. During this period, therefore, data which has been written into the RAM from the preceding sector can be processed, without any risk of interference with other data produced by the read head. During this period, therefore, the address register of the RAM can be controlled in response to any desired program sequence. It is possible to complete most of the processing of data read from a sector of the disk storage unit within the gap which separates adjacent sectors, so that when the successive sector becomes available for reading, the information read into the RAM 12 from the previous sector may be discarded in conjunction with the reading into the same location of the RAM 12 the data received from the new sector. That is, the new information is written over the old information. Of course, if the processing of the previous sector involves the necessity of writing information from the RAM 12 back onto the disk, it will be necessary to perform a writing operation before the next reading operation can be executed, since, in the preferred embodiment, storage capacity is provided for only a single sector.

At times the calculations required to process data read from a sector exceed the inter-sector gap. When this occurs, the RAM 12 is not available to read the first characters recorded on the next sector, because the read head passes over these characters while the previous data is still being processed. As soon as the processing is complete, however, reading of the next available sector is performed, with the skipped sector being left for later processing.

During each reading operation, a check of the data read from the disk is carried out contemporaneously with the writing of the data into the RAM 12. A so-called CRC check is provided, the result of which is inspected to determine whether there has been an unambiguous transfer of correct data during the reading operation. In the event that the CRC check fails, the data read from that sector during the sector reading operation is ignored, and the fact that a reading failure has occurred is recorded, with no further operations occurring until the next available sector is reached, which is read and processed in the normal manner.

Any sector which was not correctly processed will be read again when it next passes under the read-write head, during the next revolution of the disk, because the preceding sector, having been already processed, will then not cause any delay in the initiation of the reading operation. It thus occurs that sometimes alternate sectors of the disk are processed, because of the time required to complete the processing of any given sector. In any case, the next available sector which can be read after completion of the processing is read and processed, without waiting for an entire revolution of the disk before beginning the processing. By this means, processing of an entire track on the disk typically takes one or two revolutions of the disk, as opposed to a separate revolution for each sector which is processed. A great time savings is accordingly effected.

Although only a single disk storage device 18 is shown in FIG. 1, it will be appreciated that a plurality of such units can be employed, and apparatus is provided for selecting one of a plurality of disk storage devices for communication with the remainder of the apparatus of FIG. 1. A disk selector register 50 is set, with information from the data bus 9, and the output of this register controls a data selector 52, to select command information stored in a disk command register 54 and transmit it to a selected disk storage device like the unit 18, over lines 56. When the command is a write command, a single bit of data is written to the selected disk over the write line and that bit is recorded onto the track being accessed by the selected disk unit.

The disk select register 50 also controls operation of a multiplexer 58 to select data and status signals from a selected disk storage unit, manifesting the storage signals $\overline{TKO}$, WE and $\overline{INDX}$ on lines 59–61, and a bit being read on a line 62. These signals represent, respectively, the inverted track-zero, write enable, and index pulses. The line 62 is connected to the set input of a flip-flop 64, directly, and to its reset input through a pair of delaying one-shot multivibrators 66 and 68, so that the flip-flop is in its set state for a predetermined time, for each data bit. The output of the flip-flop 64 is connected to one input of a multiplexer 70, which controls the carry-in bit of the ALU 20. By this means, data from the selected disk storage unit 18 is entered directly into the lowest order bit of the accumulator, from which it can be shifted leftwardly (by causing the ALU to add its contents to itself, via the multiplexer 24). When eight bits have been assembled in this manner, they are transmitted over the data bus 9 to the RAM 12, as described above.

A one-of-four decoder 72 has four control inputs connected to four outputs of the ROM, and selects one of four operations, viz., writing information from the data bus 9 into the RAM 12, the disk select register 50, the disk command register 54, or into a data output register 74. The data output register is connected over lines 78 to the CPU 14, so that data can be furnished to the CPU from the data bus.

Commands from the CPU are transmitted over lines 80, which serve as one input to the multiplexer 24, which selects the A input to the ALU 20. Address information and data accompanying the command is connected over lines 82 to the data bus 9.

The multiplexer 24 is adapted to select one of four inputs to the ALU, in response to data present on two control outputs of the ROM 10. A first input consists of eight outputs of the ROM which may represent data, these being eight outputs which are different from the two which control the multiplexer 24. The multiplexer can also select the eight bits of the data bus 9, or the eight outputs of the RAM 12, stored in the RAM output latches 84. The fourth input consists of four command bits from the CPU 14, over the lines 80, and four status bits, namely $\overline{CY}$, $\overline{WE}$, $\overline{SW}$ and $\overline{TKO}$. The SW signal is produced by a service during maintenance and diagnostic procedures. These bits, as well as the command bits from the CPU, can cause jumps in instruction routines, via the multiplexer 34.

The multiplexer 34 is controlled in its operation by four outputs from the ROM 10. It is adapted to supply to the address register 32 either a clock signal, causing it to be incremented, or a load signal, causing it to be loaded in accordance with the information present on eight outputs of the ROM 10 or the ORC register 40, under control of a ninth ROM output.

Eight inputs are provided to the multiplexer 34. A first is from the A=B output of the ALU, the second and third are the CY and $\overline{CY}$ status signals, indicative of the presence or absence of a carry bit from the ALU, a fourth is connected to a source of voltage at a terminal 86; the next three are connected to receive status bits INDX, WRDY, and RRDY, indicative of an index signal from the disk storage device, and write-ready and read-ready status; and the last is the overflow or carry out bit from the ORC register. Any one of these eight inputs can be selected at any one time, with the one connected to the terminal 86 providing an unconditional jump in the instruction sequence, with all the rest providing conditional jumps.

A further one-of-four decoder 88 is provided, controlled by four outputs from the ROM 10, for selectively loading the ORC register with the contents of the data bus 9, incrementing the ORC register, loading the ORB register from the data but 9, or performing no operation.

Only six commands are required to enable the CPU 14 to operate the control unit. These are respectively:

0—set read and write pointers RP and WP to DD
1—get byte from location RP and increment RP
2—put byte at location WP and increment WP
3—seek to track DD
4—read sector DD or next sector
5—write sector DD or sector last read In each of the above commands, DD refers to the data bus 9, which, at the time of the command, contains the required data. Where several bytes (or eight bit words) are necessary to the desired sequence of operations, such as to select a given disk storage unit, set search limits, establish the length of the records to be searched, etc., the put byte command 2 may be executed repetitively, until the correct initial operating condition of the control unit is assumed.

The instruction set used by the control unit of FIG. 1, which are stored in a specific location of the RAM 12, are illustrated in FIG. 2. Each instruction comprises two four bit words, in which the hexadecimal value is indicated as 0-9 for 0-9, and A-F for 10-15. The instruction set includes instructions for communicating with the CPU 14 as well as processing data from the disk storage device 18. The operations performed by each instruction are listed in the following table:

TABLE 1

| | | | |
|---|---|---|---|
| 00 | Succeed | (1) | Return to CPU with code of 80. |
| | | (2) | RP & WP set to start of record. |
| 01 | Fail | (1) | Return to CPU with code of FF. |
| | | (2) | RP & WP set to = 00. |
| 02 | Fail Sector | (1) | Mark sector number in SRM |
| | | (2) | increment sector count. |
| | | (3) | If write switch is set, write sector and clear write switch. |
| | | (4) | If sector count = 26 read a sector not marked in SRM. |
| | | (5) | Set RP & WP at start of sector & continue search. |
| 03 | Fail Record | (1) | Increment RP & WP by logical record length which is at IF or at start of this record if IF is FF indicating variable length records. |
| | | (2) | Set program pointer to 20. |
| | | (3) | If sector end is passed go to fail sector. |
| 04 | Skip on EQ | (1) | If result of last operation was A = B (EQ), increment program pointer. |
| | | (2) | If program pointer is 30, fail record. |
| 05 | Skip on NE | | Same as 04 for not equal |
| 06 | Skip on HI | | Same as 04 for A B |
| 07 | Skip on LO | | Same as 04 for B A |

TABLE 1-continued

| | | |
|---|---|---|
| 08 | Skip on HE | Same as 04 if EQ or A B |
| 09 | Skip on LE | Same as 04 if EQ or B A |
| 0A | Inc Count 1 | Increment counter at 59-5A |
| 0B | Clear count 1 | Clear counter 59-5A |
| 0C | Inc count 2 | Increment counter 5B-5A |
| 0D | Clear count 2 | Clear counter at 5B-5C |
| 0E | Set write switch | When processing of this sector is complete, write the sector from RAM |
| 0F | Clear write switch | Set write switch = 0 |
| 10 | OP is add | ALU adds X + Y |
| 11 | OP is subtract | Y − X, storing result in Y |
| 12 | OP is compare | Y − X |
| 13 | OP is move | move data X Y |
| 14 | OP is test mask | X Y |
| 15 | OP is logical or | XVY |
| 16 | OP is exclusive or | XVY |
| 17 | OP is not (invert) | complement X |
| 18 | OP is clear | reset X |
| 19 | OP is exchange | exchange X and Y |
| 1A | OP is test | compare X to 0 |
| 1B | OP is rotate left 1 bit | rotate X left |
| 2L | KL OP REC | The operator previously set is used between Key 1 and Record for a length of L + 1. That is, X is Key 1 and Y is Record |
| 3L | REC OP K1 | X is Record and Y is Key 1 |
| 4L | K2 OP REC | X is Key 2 and Y is Record |
| 5L | REC OP K2 | X is Record and Y is Key 2 |
| 6L | K1 OP K2 | X is Key 1 and Y is Key 2 |
| 7L | K2 OP K1 | X is Key 2 and Y is Key 1 |
| 8L | REC OP Program and Succeed | X is Key 1 and Y is 00 |
| 9C DD | Execute | Execute external command C with Data DD. |
| AJ | Jump (uncond.) | Jump to location J + 20 in program. |
| B0 DD | Set Scan Pointer | Scan Pointer is set to record pointer plus DD as a signed number. |
| B1 DD | Increment Scan Pointer | Scan pointer is incremented by DD as a signed number. |
| C1 RR | Repeat (Do Loop) | Repeat last 1 instructions RR times. |
| D0-FF | Invalid OP codes | |

Figure 3:
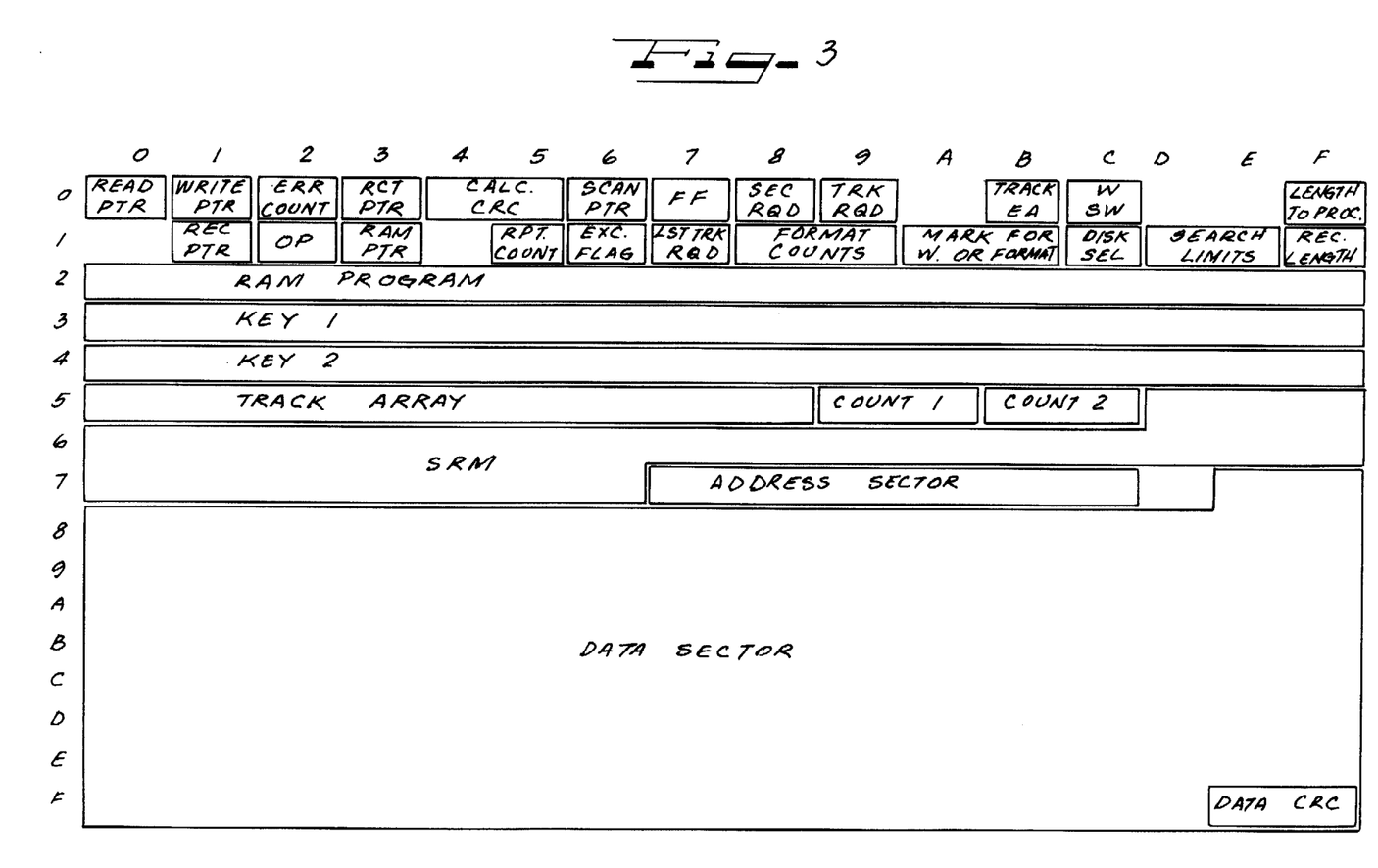
FIG. 3 is a table showing the mapping of the random access memory.

FIG. 3 illustrates a map of the contents of the RAM. The total capacity of the RAM is 256 eight-bit words, and the 256 words are arranged in 16 rows of 16 words each, the rows and columns being identified as O through F. The RAM program itself is confined to a single line, namely, line 2, containing words 20 through 2F. Two operand storage locations, Key 1 and Key 2 (hereinafter referred to as K1 and K2), are assigned to lines 3 and 4, taking up words 30 through 3F and 40 through 4F, respectively. Data is stored in 130 words beginning at 7E and extending through FF. This portion of the RAM is employed when a sector is read from the disk into the RAM, and this portion of the RAM stores one complete sector at a time.

Extending from 5D through 76 is the sectors which have been read map or memory, (hereinafter referred to as the SRM), which contains enough capacity to provide an indication of the sectors which have been read in connection with a given operation in a single track.

Four words in line 1 are devoted to the storage of control words, as follows. Location 1C is the disk select word, which identifies the disk storage unit selected among several units associated with the apparatus. At locations 1B and 1E are stored the two "search limit" words. The search limits describe the limits of a search to be performed in connection with data stored on the disk for the execution of a given program. At location 1F is stored the "logical record length" word, which identifies the length of the record being processed by the current program.

Counter No. 1 is located at storage locations 59 and 5A, and counter No. 2 is located at storage locations 5B and 5C. These counters are incremented and decremented during various operations of the apparatus in order to provide control information in the course of the execution of a program. The identification of the address section resides in locations 77 through 7C, and the identification of the data sector is located at storage locations 7E and 7F.

The remaining areas of the RAM are not dedicated, but are available for miscellaneous use, and may be employed by a programmer of the equipment for storing the results of intermediate calculations and the like.

When a program is run on the disk controller unit, the program always starts at storage location 20, which is the first word of the program area. Each word in the program area, as well as elsewhere in the RAM, comprises an eight-bit word, such being referred to herein by two hexadecimal digits.

The provision of a program which is only 16 words in length requires the use of a powerful instruction set, so that uses of only relatively few words of program can bring about the execution of relatively complex routines. The instruction set described above, employed with the RAM program, employs arithmetic, logic, and move instructions which may be referred to as zero address instructions, which are used to set operators (or functions) used with subsequent instructions designating addresses to which the operators apply. In this manner the operator instructions are separated from the instructions designating the operands which are employed in an operation. Even though this requires two words of program to define a complete instruction involving an address, it will be seen in connection with the following description that the use of this technique, contrary to expectations, is one which permits a complete program to be stored in but a few words of RAM storage.

The external commands of Table I are communicated to the disc controller unit from the CPU, and may also be employed in the RAM program, by means of the 9C instruction.

When an O command is received, the read pointer and the write pointer are set in accordance with the eight bits of data present on the data bus.

The Get command 1 moves data from the controller unit to the computer, using the address pointed to by the read pointer. This transfer is asynchronous, and the eight bits of data included with the Get command are ignored. For a synchronous transfer, if desired, the eight bits constitute a length code.

The Put command 2 moves data from the CPU to the controller unit, using the eight bits from the computer to set the write pointer. The writer pointer is thereafter incremented by 1.

The Seek command 3 causes the controller unit to seek the track indicated by the eight bits of data included in the command. The track identification has been verified by reading, and if the track read is not the one which is sought, the seek instruction is repeated until the track is found. The SRM and Data Input areas are then cleared preparatory to a write instruction. If the data associated with the command is FF, this is replaced with the last explicitly selected seek, and the seek instruction is then performed as if the last explicitly selected seek had been identified by the data bits of the command.

The Read command 4 causes the controller unit to read the requested sector, from the track currently being accessed, into the data portion of the RAM. When an entire sector has been read, the code 80 is produced, which is transmitted to the computer to indicate completion of the Read command. The CRC calculation is effected as the data is read from disk, and a CRC failure causes the same sector to be reread. If the sector is read ten times without a correct CRC being calculated, a code 22 is generated for transmission to the CPU to indicate that an error has occurred during reading. If an FF is stored in location 07 of the RAM, CRC errors are ignored. The read and write pointers are set to 7E at the completion of the Read command.

During a Read command, when the data bus data is FF, which cannot be a sector number, the controller initiates the program which is in line 2 of the RAM storage. The sector which is resident in the data portion of RAM is operated on with the RAM program in storage. If there is no sector in RAM (the data sector having been cleared) the first sector encountered which is not marked in the SPM is read into the data sector before the program is initiated.

The Write command 5 causes the data and the data sector of RAM to be written to the requested sector, identified by the data portion of the command. The CRC is calculated during writing and the calculated CRC is written at the end of the data. If the data on the data bus, during the Write command, is FF, the contents of the data sector in RAM is written to the sector from which the data was originally read.

Two additional commands besides those listed on page 15 are available for special uses.

The Execute command 6 causes the controller unit to execute the RAM program beginning at location 20 of the RAM, provided the data portion of the command is FF. This is done without any attempt to reposition the scan pointer or the record pointer, or to determine whether or not a record is present in the data sector of RAM. If the data portion of the command is FE, the controller unit starts the RAM program at the RAM address stored in the location 1C, address 13 of RAM. The address 13 normally contains the address of the next instruction word after a halt in the execution of a program.

When the data portion of the command is 00, the controller executes a single RAM instruction, and then halts. This mode of the command is useful during debugging of programs.

The Format command 7 causes several events, and it is used when it is desired to write information to a blank or previously unused disk, or a disk which is desired to be reformatted because of some defect in a track's surface, or the like. The mark to be written during formatting is written into locations 18 and 19. In storage locations 1A and 1B there is written a number which corresponds to the number of 2 micro-second intervals (following the trailing edge of the index hole) before which the format control is to begin writing during the formatting operation. In position 1C is written the starting position of the record to be written. After this information has been written to the appropriate RAM locations, the trailing edge of the index hole is detected and the appropriate number of 2 micro-second intervals is counted off by incremating the count stored in 1A and 1B by 1 for each such interval. Then 6 bytes of zero data bits are written, interspersed with clock bits to start up the write head, and then the record pointed to by the address in 1C is written until the write pointer reaches the end of the data sector in RAM (at FF). The write head is then turned off and a code 80 is transmitted to the CPU to signal completion of execution of the command.

The Format command 7 can be used to recover data when a track on a disc has been damaged in some way. By selecting an appropriate number of two microsecond intervals, the formatting operation can cause a sector to start first after the defect so that subsequent information can be recovered and recorded in another disk storage unit, thus minimizing the amount of data which is lost, by reason of the defect.

The Execute command 6 is used primarily for debugging purposes with new programs. The remaining six commands are all that are needed for the remote or central computer to control operation of the disk controller and all of its functions.

In operation, communications between the CPU and the disk controller unit is initiated with a 0 command, setting the read and write pointers of the RAM. The Put command 2 then enters, 1 byte at a time, the program information (which may be either data or instructions) from the CPU to the unit. A sequence of two commands is effective to cause the CPU to write successive instructions into the program area of RAM, since the write pointer is incremented during each Put instruction. When the RAM program is entered for a maximum of 16 eight-bit words or bytes, and the appropriate data is entered into the auxiliary storage locations of RAM, a single Read command 4 causes the controller unit to cycle through the steps of the program set into its program area, and when this program is completed, it signals completion to the CPU. The results achieved by execution of the program may then be read into the CPU by the use of a Get command 1.

An example program will be described to illustrate the operation of the apparatus. Assume that a series of customer files maintained in a disk storage unit, with each file containing a customer file number and a record of daily transactions in the account. The external CPU constructs the details of the records, on an on-line basis, each day, and it is desired to update each customer file at the end of the day after the close of business. The significant portions of the file, as far as update information is concerned, contain the following items, each having a length (in number of bytes) as follows:

| Account number | 1 byte | total length of customer file |
| --- | --- | --- |
| Account number | 3 bytes | customer account number |
| Amount taken today | 2 bytes | today's disbursements |
| Amount taken yesterday | 2 bytes | yesterday's disbursements |
| Amount taken two days ago | 2 bytes | disbursements of two days ago |
| Amount taken three days ago | 2 bytes | disbursements of three days ago |
| Four day limit | 2 bytes | maximum disbursements in four day period |

The sample program is designed to update today to yesterday, yesterday into the day before, and so on. The oldest field is to be added to the four day limit and to the control total, and the number of accounts which were active four days ago is to be calculated.

The following is the complete program, entered into RAM at the locations shown, for executing the above:

| RAM LOCATION | OP CODE | DESCRIPTION |
| --- | --- | --- |
| 1D | 01 | Disk 1 |
| 1E | 3F | File is 40 tracks long |
| 1F | FF | Variable length records |
| 20 | 18 | OP is CLEAR |
| 21 | 33 | Clear K1 and bypass length and account number |
| 22 | 19 | OP is EXCHANGE |
| 23 | 31 | Roll $\phi\phi$ to today, today to yesterday, etc. |
| 24 | 04 | Skip on EQ |
| 25 | OD | Set Write Switch |
| 26 | C3 | DO to 23 |
| 27 | 03 | 3 Times |
| 28 | 10 | OP is ADD |
| 29 | 64 | K1 OP K2 |
| 2A | 21 | K1 OP REC |
| 2B | 1D | OP is TEST |
| 2C | 21 | REC OP K1 |
| 2D | 04 | SKIP EQ |
| 2E | OC | Inc Counter 2 |
| 2F | 03 | Get Next Record |

The first three instructions load RAM locations IC–IF, to select disk 1, identify the file length and identify the records as being of variable length. The RAM program begins at location 20.

The first instruction, at location 20, sets the operation to clear (18) and (33) clears Key 1 and passes over bytes (3+1) to pass the record length and the account number. Then (19) sets the operation to exchange and (31) sets the operands to the record and Key 1, so that the "today" total is cleared, successive records are exchanged with Key 1, serving to update the accounts for today and the three previous days. This is repeated four times (or three times after the first time) by the 03 instruction specifying what is to be repeated. The write switch is set by the (OD) instruction, provided the updated information is not the same.

Then the (01) instruction sets the operation to Add and the (64) instruction specifies that the contents of Key 1 and Key 2 are to be added for a length of five (4+1) bytes, after which the instruction (21) identifies the operands to be added as the contents of Key 1 and the contents of the location specified by the record pointer, for a length of 2 bytes. This updates the four day limit account.

Then instruction (1A) sets the operation to Test with the instruction (21) setting the operand as the contents of Key 1. If Key 1 is not equal, Counter 2 is incremented by the (OA) instruction and the (03) instruction increments the record pointer by the record length, to advance to the next record, which is similarly processed. The number of accounts active four days ago is accumulated in Counter 2.

Each time the write bit is set, by instruction (OD) in location 25, the record identified by the WP is written so that the file is updated on the disk storage unit as it is processed. It will be appreciated that if no writing is required, the operations of the program can take place during a single revolution of the disk, for each track processed, since communication with the CPU is not necessary during execution.

From the above, it is apparent that the apparatus of the present invention is extremely versatile and powerful, and that only a relatively little amount of storage space is required for the RAM program. Indeed, in the program described, only sixteen bytes of program are required. It should also be noted that the apparatus of the present invention is capable of dealing with logical records, rather than with large blocks of data of fixed length, and that it can process data, pursuant to instruction from the external CPU, entirely independent of the CPU.

The power of the zero address instruction is also evident because the operation is specified independently of the operands, so the operands can be charged with a single instruction with no need to simultaneously change the operation being performed. This leads to considerable programming simplification and saving of programming space in memory.

Reference will now be made to the diagrams of FIG. 4 which indicate the progress of certain operations employing the apparatus of the present invention. Although the diagrams are described in terms of program or software operations performed by the apparatus illustrated in FIG. 1, it will be understood by those skilled in the art that the diagrams are describing functions which can be carried out by other means, such as apparatus in which a separate specific unit is provided for each of the boxes shown in the diagrams of FIG. 4. For example, where a diagram includes a diamond-shaped block, a decision unit or comparator may be provided which provides an output signal on one or two output lines in accordance with a comparison or non-comparison of data presented at two input ports, which may represent single or multiple bits of data each. Each rectangle block may be replaced by a series of gates which are energized by an output line of the preceding block or by a signal indicating completion of an operation controlled by the preceding block. Thus, the diagrams have physical as well as procedural connotations. As all of the hardware required to implement the diagram is well known and conventional in the art, it will not be described in detail. The manner of connecting such hardware in accordance with the diagrams of FIG. 4 is apparent to those skilled in the art. Because of the procedural and physical connotations of the blocks illustrated in the diagrams, they will be referred to as "units".

FIG. 4a illustrates a diagram showing operation of the Seek command. When the diagram is first entered, control is given to unit 100, which determines if the track selected is equal to FF. If it is, then the track selection should be made equal to the track previously selected. If not, the 09 RAM location (FIG. 2) is set equal to the number of the track selected by unit 101 and control is passed to unit 102, which sets the ORB register equal to the contents of the 09 RAM location. If the track number selected is FF, unit 102 receives command directly from unit 100.

The units 103-106 receive control, which respectively set the disk select register FDS equal to DSS, ORB equal to DSS, ORC equal to 50 plus ORB and ORB equal to the desired track or the track selected TS. Then control passes to unit 107 which compares the selected track with the current track, to determine whether it is necessary to seek back. If not, control is passed to unit 108 which compares the current track location with the desired track location. If no comparison is found, control is passed to unit 109 which sets FDC equal to ORB minus 2, causing the track index mechanism to seek forward. Then control goes to unit 110 which increments the RMC counter, which keeps track of the current track location. Afterwards, control goes to unit 111, which introduces a delay of 5 microseconds before passing control to unit 112.

If a backward seek is necessary, control would have been passed from unit 107 to unit 113, which sets FDC equal to ORB equal to OOA, causing the track selection apparatus to seek in a rearward direction. Then control is passed to unit 114 which decrements the content of the RMC counter, consistent with a rearward seek, before passing control to the unit 111.

The unit 112 sets FDC equal to 010 plus ORB and then passes control to a unit 112a which inserts a delay of 5 milliseconds, before returning control to the unit 102. These units produce drive pulses to the track selection mechanism every 5 milliseconds.

The foregoing operations are repeated, until unit 108 indicates that the correct track has been selected, after which control is passed to unit 115, which causes the address of the first available sector on the track to be read.

Figure 4B:
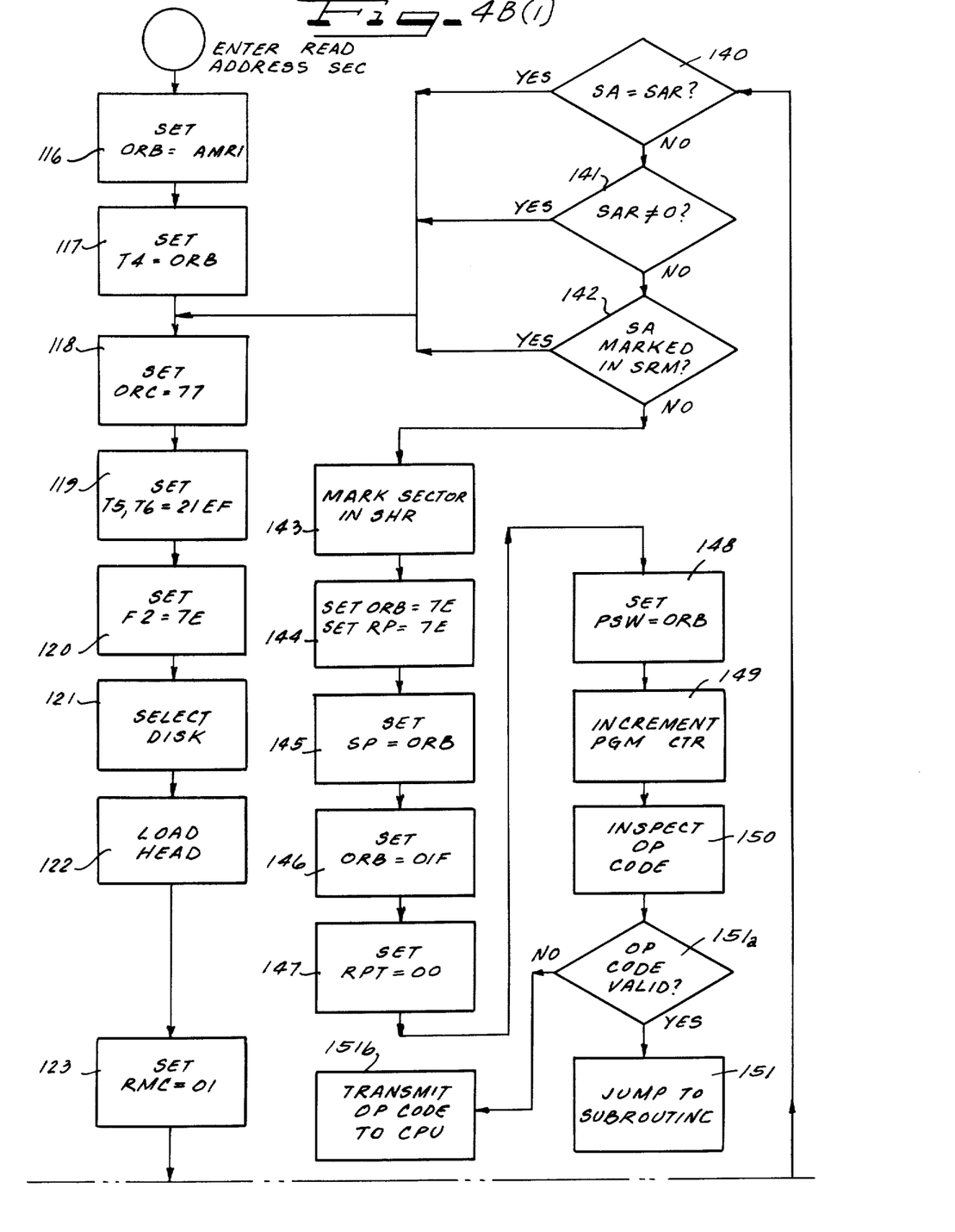

FIG. 4b shows the Read Address Sector routine which is entered via unit 115 in FIG. 4a. Control is first passed to a series of units 116-122, which respectively sets ORB equal to an address AMR1, which allows a return to the proper place in the program sequence; sets T4 equal to ORB to save the address; sets ORC equal to 77, to allow a reading of the address sector; sets T5 and T6 equal to 21EF, the initial value for a CRC calculation; sets F2 equal to 7E, to allow recognition of an address mask; selects the desired disk; and loads the read head for that disk.

Then a unit 123 receives control, and sets RMC equal to 01; to prepare for a read operation, after which unit 124 resets ORB and T2, to prepare for searching for a mark from the track. RMC, in this case, is the address of the storage location in which data bits are to be assembled. The unit 125 receives control and waits until a read ready signal is received, which indicates that a data bit has been received at the flip-flop 64 (FIG. 1).

A unit 126 inspects whether the content of ORB is equal to F5, which is the sequence of bits beginning all recorded marks on the disk and if so, passes control to unit 127, which determines whether the mark received is the kind of mark which is being sought. If not, control passes to unit 128 which determines whether the received mark is an address mark, and if not, returns control to unit 125, which waits for the next data bit. If an address mark is recognized, the address sector register is updated by unit 129 before control returns to unit 125, incrementing the identification of the current sector.

If the unit 126 determines that the received data is not a mark, control passes to units 130-132 which shift the received data through the ALU into T1 and T2, and then sets ORB equal to T1.

Then control passes to a unit 133 which examines the mark to determine whether it is an index mark, and if so, an error counter is incremented by a unit 134, and the state of the counter is examined by a unit 135. If the error counter contents exceeds 100, control passes to a fail routine, to indicate that the track has made 100 revolutions (i.e. 100 index pulses have been received) during the Read Address Sector routine. If the counter contains less than 100, control passes to a unit 136 which determines whether the index is still being sensed, and if so, retains control, through a delay unit 137, until the index signal vanishes, and then returns control to the unit 125. If the unit 133 does not sense an index, control returns to the unit 125 directly.

When the unit 127 recognizes a particular kind of mark which is being sought, control passes to a unit 140 which compares the sector address of the current sector with the sector address requested, and if they are equal, control returns to the unit 118, preparatory to reading data from the sector. If not, control passes to unit 141, which examines whether any sector has been requested. If so, control returns to the unit 118 to continue the search for the requested sector. If not, control passes to a unit 142, which determines whether the current sector has been marked in the SRM (sector read memory). If it has, control returns to the unit 118 to resume the search for the requested sector. If not, control passes to unit 143 which marks the sector in the SRM, and passes control to units 144-150, which prepare the apparatus for operating on the data contained in the sector. Specifically, ORB and the read pointer are set to 7E, by unit 144; the scan pointer is set equal to ORB by the unit 145; ORB is then set to 01F, to prepare the program counter, by the unit 146; and the repeat counter RPT is reset to zero by the unit 147. The program counter PS is then set equal to the contents of ORB, by the unit 148; and the program counter is incremented by the unit 149. Then the operation code (stored in RAM) is inspected by a unit 150, and (if it is a legal operation code), a jump operation is executed, based on the coded representation of the operation which is current. If a code is sensed which is not a legal operation code, the illegal code is transmitted to the CPO, to serve as a call for a special function. The particular function which is executed is a matter of choice, and is selected by appropriate programming of the CPU. The result of the jump operation is to pass control to the subroutine, stored in ROM, associated with that operation, after which control is returned to execute the next instruction contained in the program area of RAM, incrementing the program counter to gain access to the next instruction.

From the discussion of FIGS. 4a and 4b, several advantages of the present invention are apparent. The seek command is executed in an open loop manner, without any requirement of feedback from the shaft of the track selecting stepping motor, since verification of the correct track is made by reading the track identification from the track, rather than inferring it from the motor shaft position. This allows stepping the track selecting motor as rapidly as possible, without regard for the speed of response of the motor. In this way, track seeking is accomplished much more rapidly than by normal means. If the current track position is not correct, it is quickly corrected by setting FDC and ORB for a forward or backward seek, whichever may be required.

When no particular sector is required, as for example when the same operation is to be performed on the data of all sectors of a single track, the sectors which have been read map SRM maintains a current list of sectors which have been processed with the current routine. If the current sector has been read, it is passed over, but if it has not, it is processed first irrespective of its order on the track being read. In this way, there is no need to wait for the beginning of a track to begin processing, and the initiation of processing with any random sector does not interfere with processing all of the sectors, for the SRM maintains a list of all of the processed sectors, so that selection of the next track does not occur until all the sectors on the track have been read and processed.

FIG. 4b also illustrates the use of the separated operation instruction. Unlike instruction formats heretofor known, the operation instruction of the present invention has no address or addresses associated with it, and hence may be referred to as a "zero-address" instruction. Although this requires two separate instructions for execution of some functions, such as one for an arithmetic operation and another to define the position of an operand or the result of the arithmetic operation, in cases where the same operation is performed repeatedly, on successive items of data, the zero-address instruction does not require mere time to execute, but does materially increase the power and flexibility of the apparatus, since its instructions are not limited to use only with certain prescribed addresses. Moreover, the zero-address instruction feature materially reduces the number of bits required to define an instruction, and contribute to savings of storage space.

In the embodiments of the present invention illustrated in FIG. 1, the following components are used for the various functional blocks:

| | |
|---|---|
| ALU 20 | Two units, type 74181 connected to form an 8-bit ALU |
| ORB 28 | Two units, type 74161 connected to form an 8-bit register |
| ORC 40 | same as ORB |
| RAM 12 | Eight units, type 93410 connected to form an 8-bit, parallel input, parallel output memory |
| ROM 10 | Six units, type 1M5625, connected to form a 24-bit parallel output memory |
| Address Register 32 | Three units, type 74161, connected to form a 9-bit register |
| Multiplexer 38 | Two units, type 74157, connected to multiplex two inputs of 8-bits parallel to one 8-bit parallel output |
| Multiplexer 34 | One unit, type 74151 |
| Multiplexer 24 | Four units, type 74153 connected to multiplex four inputs of 8-bits parallel to one 8-bit parallel output |
| Latches 84 | Two units, type 7475, connected to form an 8-bit register |
| Multiplexer 70 | One unit, type 74153 |
| Decoder 88 | One-half unit, type 745139 |
| Decoder 72 | One-half unit, type 745139 |
| Disk Command Register 54 | Two units, type 74161, connected to form an 8-bit register |
| Disk Select Register 50 | One unit, type 74161 |
| Data Selector 52 | Two units, type 74155, connected to transmit data from the Disk Command Register to one of four disk storage devices, selected by the Disk Select Register 50, over a 4-bit parallel output |
| Multiplexer 58 | Two units, type 74156, connected to make available, at a 4-bit parallel output, the form output signals from a disk storage device selected by the Disk Select Register 50 |
| Data Output Register 74 | Two units, type 74161, connected to form an 8-bit register |

In the embodiment of FIG. 1, the various outputs of the ROM 10 are connected as follows, for use with the routine listed in Appendix A hereof. Appendix A (which is not included with the printed patent, but which is available upon inspection of the file wrapper) contains a complete list of ROM instructions for the apparatus of FIG. 1. The appendix has been placed in the file of this application. The various outputs of the ROM 10 are connected as follows in the apparatus of FIG. 1.

| ROM OUTPUT | CONNECTIONS |
|---|---|
| 0 | Multiplexer 24, pins 14a, 14b, 14c, 14d |
| 1 | Multiplexer 24, pins 2a, 2b, 2c, 2d |
| 2 | Multiplexer 70, pin 14 |
| 3 | Multiplexer 70, pin 2 |
| 4 | Multiplexer 34, pin 11; Decoder 72, pin 14 |
| 5 | Multiplexer 34, pin 10; Decoder 72, pin 13 |
| 6 | Multiplexer 34, pin 9; Decoders 72 and 88, pin 5 (EN)-OR with $\overline{ROM7}$ |
| 7 | Multiplexer 34, pin 7 (EN); $\overline{ROM7}$ to Decoder 72 and 88, pin 5 (EN)-OR with ROM6 |
| 8 | ALU20-pin 6; Address Register 32, MSB, pin 3; |
| 9 | ALU20-pins 5a and 5b |
| 10 | ALU20-pins 4a and 4b |
| 11 | ALU20-pins 3a and 3b |
| 12 | ALU20-pins 8a and 8b |
| 13 | Multiplexer 38, pins 1a and 1b |
| 14 | Decoder 88, pin 2 |
| 15 | Decoder 88, pin 3 |
| 16 | Multiplexer 38, pin 2a; Multiplexer 24, pin 3a |
| 17 | Multiplexer 38, pin 5a; Multiplexer 24, pin 13a |
| 18 | Multiplexer 38, pin 11a; Multiplexer 24, pin 3b |

-continued

| ROM OUTPUT | CONNECTIONS |
|---|---|
| 19 | Multiplexer 38, pin 14a; Multiplexer 24, pin 13b |
| 20 | Multiplexer 38, pin 2b; Multiplexer 24, pin 3c |
| 21 | Multiplexer 38, pin 5b; Multiplexer 24, pin 13c |
| 22 | Multiplexer 38, pin 11b; Multiplexer 24, pin 3d |
| 23 | Multiplexer 38, pin 14b; Multiplexer 24, pin 13d |

It will be apparent that various modifications and additions may be incorporated into the apparatus of the present invention, without departing from the essential features of novelty thereof. For example, one or more of the several multiplexers may be replaced with a suitable ROM, the outputs of which represent the same data as the outputs of the multiplexers, but with greater simplicity and economy. Other modifications will be apparent to those skilled in the art.

What is claimed is:

1. A disk data control device for controlling data transmission between a disk storage device and an external processing unit, said disk data control device having an input terminal connected to said disk storage device, said disk storage device being adapted to manifest stored data and information at said input terminal in sequential blocks of serial bits, said blocks being separated by time gap intervals during which no data or information is so manifested, said disk data control device having data storage means for storing a plurality of bits of data, stored program means for storing digital representations of a program of logical operations to be carried out on said data while said data is resident in said storage means, means for initiating said logical operation only at the beginning of said time gap intervals after said data has arrived in said storage means, and before any transmission of said data to said external processing unit, writing means, connected between said storage means and said input terminal for writing data from said input terminal into said storage means as said data is presented to said input terminal, and operating means connected to said data storage means and to said stored program means and operated by said stored program means for carrying out said program of logical operations on said data while said data is resident in said storage means and before any transfer of said data from said storage means to said external processing unit.

2. Apparatus according to claim 1, including means connecting said operating means with said external data processing unit for supplying to said external data processing unit data resulting from said program of operations.

3. Apparatus according to claim 2, wherein said operating means includes means for performing logical and arithmetic operations on said data as soon as it has been written into said storage means.

4. Apparatus according to claim 1, wherein said stored program means comprises a permanently stored program storage and a temporarily stored program storage, said permanently stored program storage having a plurality of output terminals connected to said operating means for carrying out said program of operations by sequentially manifesting unique combinations of control signals at said output terminals, and means responsive to said temporarily stored program storage for selecting a given sequence of operations corresponding to a sequence of program instructions stored at successive locations in said permanent program storage.

5. Apparatus according to claim 4, wherein said temporarily stored program storage is adapted to manifest a digital representation of an operation without any address information associated therewith, and means associated with said permanent program storage for executing an instruction jump in response to said operation representation.

6. Apparatus according to claim 5, wherein said temporarily stored program storage is adapted to manifest an operand address independently of an operation instruction, said operating means being responsive to said address manifestation for repetitively carrying out operations on data stored at locations corresponding to said manifested addresses.

7. Apparatus according to claim 1, wherein said storage device comprises a multiple-track disk storage device having a movable track selecting mechanism, and wherein said operating means comprises moving means for moving said track selecting mechanism in a predetermined direction, and means for verifying selection of a given track only by reading data from said track.

8. Apparatus according to claim 7, wherein said moving means comprises pulse responsive means for moving said track selection mechanism, and means for generating a series of pulses for moving said track selection mechanism, which pulses have a repetition rate in excess of the speed of response of said track selecting mechanism.

9. Apparatus according to claim 1 wherein said storage device has a plurality of storge sectors on a track, said data storage means including means for storing a digital representation of the sectors of a given track which have been processed through said program of logical operations by said operating means under control of said stored program means, manifesting means for manifesting whether an individual sector has been processed from said track, and operating means connected to said stored program means and responsive to the manifestations of said manifesting means for controlling the reading of sectors which have not yet been processed and the writing of said unprocessed sectors into said data storage means.

10. Apparatus according to claim 9, including means for initiating said reading immediately after sensing a portion of said stored program which requires said reading, said initiating being independent of the position of said disc storage device at the time reading is initiated.

11. Apparatus according to claim 1, wherein, said data storage means, said stored program means and said operating means being mounted in close physical proximity to said disk storage device.

12. Apparatus according to claim 11, wherein said data storage means, said stored program means and said operating means are located in a common housing with said disk storage device.

13. Apparatus according to claim 11, including said external data processing unit being located remotely from said disk storage device, and including means connecting said operating means with said external data processing unit for allowing said external data processing unit to initiate a program of operations.

14. Apparatus according to claim 13, including means connecting said operating means with said external data processing unit, whereby the results of said program of operations is transmitted to said external data processing unit.

15. Apparatus according to claim 1, wherein said stored program means comprises a read only memory, address register means for accessing predetermined addresses of said read only memory, and means connecting an output of said read only memory to an input of said address register so that one bit of any said predetermined address is determined exclusively by the output of said ROM.

16. Apparatus according to claim 15, including a random access memory, said random access memory having a plurality of address inputs for controlling access to predetermined addresses of said random access memory, and selectively operable multiplex means for applying a plurality of control potentials either to said address inputs of said random access memory, or to set less than all of the bits of said address register.

17. Apparatus according to claim 1, wherein said operating means includes means for temporarily storing data received on said input terminal, means for identifying a predetermined portion of said data for use in said program of operations, and means for carrying out said program of operations on said predetermined portion.

18. Apparatus according to claim 17, wherein said operating means comprises means for modifying said predetermined portion and writing said modified data to said storage device.

19. Apparatus according to claim 1, including a random access memory, means for storing in said random access memory a representation of an operation currently to be performed, said operating means including means for inspecting said representation and for carrying out said operation with operands originating at sources specified independently from said representation.

20. Apparatus according to claim 1, said operating means including means for reading information from said storage device into said stored program means, means for identifying operations in said stored program means, said operations being represented by predetermined operation representations, and means responsive to identification of a representation different from said predetermined representations for transmitting said different representation to said external data processing apparatus.

* * * * *